United States Patent
Bi et al.

(10) Patent No.: US 12,450,273 B1
(45) Date of Patent: Oct. 21, 2025

(54) EXTRACTIVE-ABSTRACTIVE LARGE LANGUAGE MODEL SUMMARIZATION WITH FARTHEST POINT SAMPLING

(71) Applicant: Salesforce, Inc., San Francisco, CA (US)

(72) Inventors: Bin Bi, Redmond, WA (US); Shiva Kumar Pentyala, Irvine, CA (US); Sitaram Asur, Palo Alto, CA (US); Na Cheng, Yarrow Point, WA (US); Zhichao Wang, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/777,126

(22) Filed: Jul. 18, 2024

(51) Int. Cl.
  *G06F 16/30* (2019.01)
  *G06F 16/334* (2025.01)
  *G06F 16/34* (2019.01)

(52) U.S. Cl.
  CPC ........ *G06F 16/3347* (2019.01); *G06F 16/345* (2019.01)

(58) Field of Classification Search
  CPC ................ G06F 16/3347; G06F 16/345
  See application file for complete search history.

(56) References Cited

U.S. PATENT DOCUMENTS

| | | | |
|---|---|---|---|
| 2009/0063446 A1* | 3/2009 | Ramamurthi | G06Q 30/0251 707/999.005 |
| 2022/0279002 A1* | 9/2022 | Hu | G06F 21/552 |
| 2023/0214581 A1* | 7/2023 | Niroula | G06N 10/60 715/254 |
| 2025/0061291 A1* | 2/2025 | Gardner | G06F 40/56 |

OTHER PUBLICATIONS

Article entitled "Document Summarization Using Sentence-Level Semantic Based on Word Embeddings", by Al-Sabahi et al., dated 2019 (Year: 2019).*
Article entitled "cite2vec: Citation-Driven Document Exploration via Word Embeddings", by Berger et al., dated Jan. 2017 (Year: 2017).*
Machine Translation of CN 114036297A, by Yuan, dated Feb. 11, 2022 (Year: 2022).*

(Continued)

*Primary Examiner* — Mahesh H Dwivedi
(74) *Attorney, Agent, or Firm* — Holland & Hart LLP

(57) ABSTRACT

In some systems, a set of sentences of a relatively large document may be vectorized into a set of vectors via an embedding model for summarization. Further, a subset of vectors of the set of vectors may be selected via a farthest point sampling (FPS) procedure based on a vector-space distance between respective vectors of the subset of vectors. Moreover, the subset of vectors that are associated with a subset of sentences may be ordered based on the order of the subset of sentences within the set of sentences of the document. Further, to generate a summary of the document, a query may be transmitted to a large language model (LLM) that includes a summarization prompt and the subset of sentences that correspond with the selected subset of vectors. A summary of the document may then be received from the LLM based on transmitting the query.

20 Claims, 8 Drawing Sheets

(56) References Cited

OTHER PUBLICATIONS

Article entitled "Simplifying Specialized Texts with AI: A ChatGPT-Based Learning Scenario", by Araujo et al., dated Oct. 22, 2023 (Year: 2023).*
Article entitled "Sentence Splitting for Vietnamese-English Machine Translation", by Hung et al., dated 2012 (Year: 2012).*
Article entitled "Analysis of Farthest Point Sampling for Approximating Geodesics in a Graph", by Kamousi et al., dated May 11, 2016 (Year: 2016).*
Article entitled "Exploring Sentence Vector Spaces through Automatic Summarization", by Templeton et al., dated Oct. 16, 2018 (Year: 2018).*

* cited by examiner

EXTRACTIVE-ABSTRACTIVE LARGE LANGUAGE MODEL SUMMARIZATION WITH FARTHEST POINT SAMPLING

FIELD OF TECHNOLOGY

The present disclosure relates generally to database systems and data processing, and more specifically to extractive-abstractive large language model summarization with farthest point sampling.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, a user may use a large language model (LLM) to summarize a document. In some cases, a size of the document may be relatively larger than a context window for an LLM. For example, a type of model may limit a quantity of tokens that an LLM can parse at a given time (e.g., a context window). Thus, the LLM may be unable to efficiently and accurately generate a summary of a relatively large document due to the size of the document and a size of a prompt instructing the LLM to summarize the document.

DETAILED DESCRIPTION

Figure 1:
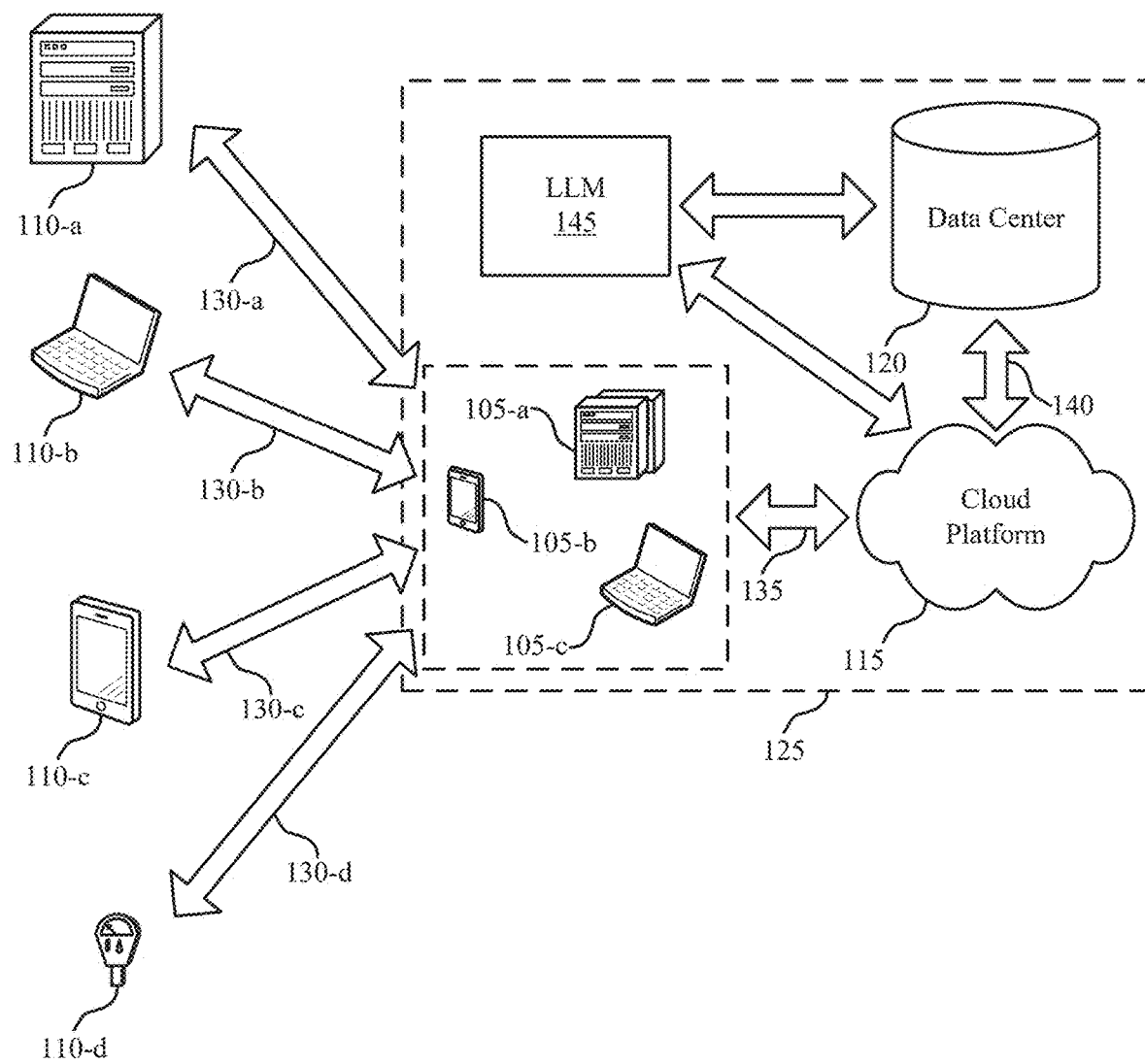
FIG. 1 illustrates an example of a data processing system that supports extractive-abstractive large language model summarization with farthest point sampling (FPS) in accordance with aspects of the present disclosure.

In some examples, generative artificial intelligence (AI) models may be used to generate content based on a prompt from a user. For example, a large language model (LLM) that is trained on a large corpus of data (e.g., text, images, video, audio, structured data, or any combination thereof) may be used to generate an output in response to a user query. In some cases, the user query may be an example of a natural language query. For example, a user may query an LLM to summarize a document in accordance with a set of instructions. In such cases, the user may transmit both a prompt to instruct the LLM and an input for summarization (e.g., a document). For example, the prompt may instruct the LLM to summarize a document in 1,000 words or less. When querying the LLM, a user may be limited to a maximum quantity of tokens within a context window of the LLM. Thus, if an LLM query exceeds a token threshold for an LLM, the LLM may return an error message to the user. Therefore, users may be unable to input relatively large prompts or relatively large documents into an LLM.

In accordance with the techniques of the present disclosure, to generate a summary of a relatively large document via an LLM, a sentence extraction phase with a farthest point sampling (FPS) procedure may be utilized to enable a user to obtain a summary of relatively large documents via a single LLM call. For example, based on receiving a relatively large document, each sentence of the document may be vectorized into a respective vector such that the sentences of the document are vectorized into a set of vectors for the FPS procedure. The FPS procedure may then be used to select a subset of sentences of the document that can be used to represent the document as a whole. That is, the FPS procedure identifies a diverse subset of salient sentences that has a size that can fit within the context window of the LLM. After selecting the subset of sentences via the FPS procedure, the sentences may be ordered in accordance with their original sentence order in the document and based on the location of the sentence within the document to assist the LLM in understanding each respective sentence within the context of the document. The ordered subset of sentences may then be transmitted, along with a summarization prompt, in an LLM query to the LLM to obtain a summary of the document. Therefore, in accordance with the techniques of the present disclosure, users may be capable of obtaining relatively more accurate summaries of relatively large documents via LLM queries relatively more efficiently by reducing the quantity of LLM queries by utilizing the FPS procedure to select the subset of sentences to input into the LLM.

In some examples, to reduce the time consumption associated with the summary generation of a relatively large document, a computing device may vectorize the sentences of the document and select the subset of sentences via the FPS procedure via a parallel processing procedure. Therefore, both the vectorization and the FPS procedure may occur concurrently to reduce the time consumption. Moreover, the parallel processing may occur over one or more central processing units (CPUs) rather than over graphic processing units (GPUs) thus reducing the cost of a system. In some other examples, a global embedding value may be used for the FPS procedure. For example, when selecting the subset of sentences via the FPS procedure, an embedding value associated with an embedding of the entire document may be used to ensure that the subset of sentences represents the document accurately and efficiently. Additionally, or alternatively, the FPS procedure may select sentences until a threshold quantity of sentences is satisfied such that the quantity of tokens of the subset of sentences is below a token maximum for the input portion of an LLM query.

Aspects of the disclosure are initially described in the context of an environment supporting an on-demand database service. Additional aspects of the disclosure are described with reference to a computing system, an FPS sentence selection diagram, and a process flow. Aspects of the disclosure are further illustrated by and described with reference to apparatus diagrams, system diagrams, and flowcharts that relate to extractive-abstractive large language model summarization with FPS.

FIG. 1 illustrates an example of a system 100 for cloud computing that supports extractive-abstractive large language model summarization with FPS in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

Additionally, or alternatively, the system 100 may support the use of an LLM 145. In some examples, the LLM 145 may also be referred to as any of an AI model, a generative AI (GAI) model, a machine learning (ML) model, an AI/ML model, or any combination thereof. The LLM 145 may be an example of a type of AI/ML model that is trained on a corpus of input data, which may include text, images, video, audio, structured data, or any combination thereof. Such data may represent general-purpose data, domain-specific data, tenant-specific data, data associated with an organization, or any combination thereof. Further, the LLM 145 may be supplemented with additional training on data associated with a role, function, or generation outcome to further specialize the LLM 145 and increase the accuracy and relevance of information generated with the LLM 145.

In some examples, the cloud platform 115 may receive a query from a cloud client 105 or a contact 110 that may include a request to produce a response (e.g., text, images, video, audio, or other information) to the query using the LLM 145. The cloud platform 115 may transmit a prompt to the LLM 145 that includes the query (or information included therein) and receive the generated output (e.g., text, images, video, audio, or other information) from the LLM 145 that is responsive to the prompt. In some examples, the cloud platform 115 may modify or supplement one or more aspects of the query to increase the quality of the response. In some examples, such modification or supplementation may be referred to as grounding.

The system 100 may support any configuration for the use of generative AI models. As illustrated herein within FIG. 1, the LLM 145 may be located outside of the subsystem 125. However, the LLM 145 may be hosted on the cloud platform 115, elsewhere within the subsystem 125, or outside the subsystem 125 (e.g., a publicly-hosted platform). Additionally, or alternatively, multiple LLMs 145 may be employed to perform one or more of the actions described as being performed by a single LLM 145. Further, in some examples, the LLM 145 may communicate with one or more other elements, such as a contact 110, the data center 120, one or more other elements, or any combination thereof, to receive additional information (e.g., that may be indicated in the query or the prompt) that is to be considered for performing generative processes.

In some examples of the system 100, when querying the LLM 145, a user of a cloud client 105 or a contact 110 may be limited to a maximum quantity of tokens within a context window of the LLM 145. For example, an LLM 145 may be capable of parsing a maximum of 16,385 tokens as an input to generate an output. A token may be an example of a unit of text that an LLM 145 is capable of reading and processing. In some cases, the size of a token may be a single character of text or may be multiple characters of text. Thus, when querying an LLM 145, the text of the prompt and the text of an input may be tokenized to calculate a quantity of tokens of an LLM 145 query. In such cases, if the query to the LLM 145 exceeds a token threshold for the LLM 145, the LLM 145 may return an error message to the user (e.g., the user of the cloud client 105 or the contact 110). Therefore, users may be unable to input relatively large prompts or relatively large documents into the LLM 145. For example, the LLM 145 may be unable to process a document that includes over 10 million tokens with a query to the LLM 145. Therefore, in some examples, when summarizing relatively large documents via the LLM 145, a user may segment a document into 1,000 segments each containing 10,000 tokens of a 10 million token document. Thus, the user may transmit 1,000 queries to the LLM 145 to generate 1,000 summaries using a 6,000 token prompt (e.g., a total of 16,000 tokens per query to the LLM 145). In some cases, the prompt may instruct the LLM 145 to make the summary fewer than 100 tokens such that a concatenation of the 1,000 summaries is a maximum of 100,000 tokens. Such procedure may be referred to as the summary of summaries approach. However, since 100,000 tokens may still be too large to fit within the context window of the LLM 145, the concatenated summaries may be segmented again. Thus, the summary of summaries approach may continue until a combination of summaries of segments of a document can fit into the context window to generate a summary of the concatenated summaries. Therefore, generating a summary of summaries may be relatively time-consuming and inefficient due to the quantity of queries to the LLM 145, and can be relatively unreliable and inaccurate due to a loss of information context within the multiple document segment summaries.

In accordance with the techniques of the present disclosure, to generate a summary of a relatively large document via the LLM 145, the system 100 may utilize an FPS procedure to enable a user to obtain a summary of relatively large documents via a single query to the LLM 145. For example, based on receiving a relatively large document with 1,000 sentences, the sentences may be vectorized into a set of 1,000 vectors. The vectors may be representative of the embedding of a respective sentence (e.g., a numeric representation of the semantic information of a respective sentence). In some cases, one or more sentences of the document may be relatively long and to ensure each sentence embedding can be accurately vectorized the system 100 may segment a sentence into multiple vectors. For example, the system 100 may initialize a token threshold of 1,000 tokens such that the system 100 may segment any sentence satisfying the token threshold into smaller manageable sub-sentences.

Once the embeddings of the sentences of a document are vectorized the system 100 may then use the FPS procedure to select a subset of vectors associated with a subset of sentences to be representative of the entire document. The FPS procedure may select the subset of vectors such that a diverse subset of sentences are selected to represent the document. Moreover, in some cases, the FPS procedure may continue until a threshold quantity of vectors (e.g., sentences) are selected. For example, the system 100 may determine the threshold quantity of vectors to select for the subset of vectors via the FPS procedure such that the subset of vectors can be included with a single query to the LLM 145 along with a prompt for the LLM 145.

Upon selecting the subset of sentences via the FPS procedure, the system 100 may reorder the sentences based on the location of the sentence within the document. Reordering the selected sentences may assist the LLM in understanding each respective sentence within the context of the entire document. The system 100 (e.g., a cloud client 105, a contact 110, or the cloud platform 115) may then transmit the ordered subset of sentences and a summarization prompt to the LLM 145 within a single query to the LLM 145 to obtain a summary of the document. Therefore, in accordance with the techniques of the present disclosure, users of the system 100 (e.g., users of a cloud client 105 or a contact 110) may be capable of obtaining relatively more accurate, efficient, and reliable summaries of relatively large documents via queries to the LLM 145.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
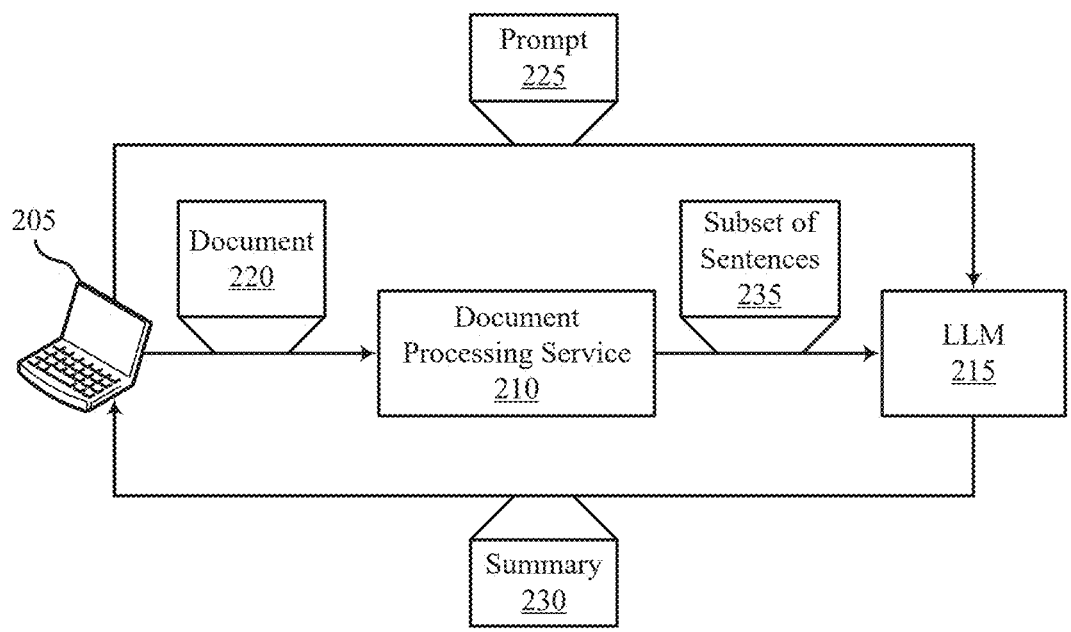
FIG. 2 shows an example of a computing system that supports extractive-abstractive large language model summarization with FPS in accordance with aspects of the present disclosure.

FIG. 2 shows an example of a computing system 200 that supports extractive-abstractive large language model summarization with FPS in accordance with aspects of the present disclosure. In some examples, the computing system 200 implements or may be implemented by the system 100. For example, the computing system 200 may a computing device 205 (e.g., a cloud client 105 or a contact 110), a document processing service 210, and an LLM 215 (e.g., the LLM 145), that may be implemented by devices or services described with reference to FIG. 1. Further, the computing device 205 of the computing system 200 may communicate with the document processing service 210, the computing device 205 may communicate with the LLM 215, the document processing service 210 may communicate with the LLM 215, or any combination thereof. Additionally, or alternatively, the document processing service 210 and the LLM 215 may be separate services within the computing system 200 or the document processing service 210 may be a sub-service, component, or a part of the LLM 215.

In some examples, to generate a summary of a document 220 a user of the computing device 205 may transmit the document 220 to the LLM 215. Moreover, the user of the computing device 205 may also transmit a prompt 225 to the LLM 215 to provide the LLM 215 with instructions to summarize the document 220. In some cases, the combination of the document 220 and the prompt 225 may be referred to as an LLM query elsewhere herein. In some cases, when transmitting queries to the LLM 215, a type of model of the LLM 215 may limit users by the size of a context window of the LLM 215. The size of the context window of the LLM 215 may be based on a type of generative pre-trained transformer (GPT) model or AI used for the LLM 215. For example, some types of models for an LLM 215 may have a context window size of 16,385 tokens and some other types of models for an LLM 215 may have a context window size of 128,000 tokens. However, regardless of the advancement of the size of the context window of the LLM 215, the complexity for the LLM 215 to generate an output may be $O(N^2)$, where N represents the context window length due to models used for the LLM 215 using self-attention operations that may scale quadratically with the size of the context window of the LLM 215. For example, the LLM 215 may use an attention mechanism to relate the different positions of a respective sentence to compute a representation of the sentence. In some cases, to accurately represent a sentence within a vector, the LLM 215 may use the self-attention mechanism to consider the position and relationship of words in a sentence. For example, the self-attention mechanism may weigh the importance of a position of a word to improve the accuracy of the sentence representation. Thus, the self-attention mechanism may be capable of determining the relevance or importance of a word or a sentence within a relatively long document. Moreover, as the LLM 215 models may be able to process increasing amounts of tokens within a context window and thus increasingly larger documents, the time complexity for the LLM 215 to generate a response may drastically increase. Additionally, or alternatively, when queries to the LLM 215 reach towards the maximum capacity of the context window for the LLM 215, the performance, accuracy, and reliability of the LLM 215 may decrease accordingly.

However, using the LLM 215 with larger inputs may be relatively useful for handling relatively large documents (e.g., the document 220) as well as audio and medical vibrational signals which may have upwards of one million samples per second. In some examples, the computing system 200 may utilize the document processing service 210 to enable users of the computing device 205 to provide relatively large inputs to the LLM 215 by utilizing an attention mechanism that applies attention to immediate local neighbors. Thus, the time complexity may scale linearly rather than quadratically based on a quantity of considered neighbors (e.g., $O(NM)$ rather than $O(N^2)$). Additionally, or alternatively, the document processing service 210 may expand the context window at inference. However, such procedures may include relatively large changes to the attention mechanism used by the LLM 215 which may increase the complexity of the LLM 215, the time-consumption of executing the LLM 215, or both.

In some examples, to avoid changing the attention mechanism used by the LLM 215, the document processing service 210 may implement an abstractive-abstractive (AA) mechanism to adjust the input size for the LLM 215. For example, the document processing service 210 may segment portions of text in the document 220 into smaller segments and use the LLM 215 to summarize each segment in parallel. After obtaining a summary 230 for each segment of the document, the document processing service 210 may merge the summaries of each segment of the document 220. If the combined summaries still exceeds the context limit of the LLM 215, the document processing service 210 then may segment the summaries further and perform the procedure recursively until a concatenation of the multiple summaries can fit within the context window of the LLM 215. Then the LLM 215 may summarize the concatenation of summaries to obtain a summary 230 of the document 220. As described elsewhere herein, such procedure may also be referred to as "summary of summaries" procedure. However, such procedure may be relatively time consuming, computationally expensive, and inaccurate. For example, a summary 230 may lose some context of information within the document 220 between the different segments of the document 220. For example, a summary 230 of a first portion of the document 220 may refrain from summarizing a concept that is important for a third portion of the document 220. Moreover, the summary of summaries approach may result in a relatively large quantity of queries to the LLM 215 which can be computationally expensive and time-consuming.

In some other examples, to further avoid changing the attention mechanism and to decrease the computational cost of summarizing the document 220 (e.g., a relatively large document), the computing system 200 may use an extractive-abstractive (EA) approach. For example, based on receiving the document 220, the document processing service 210 may divide the document 220 into individual sentences and process the sentences using an embedding model to obtain sentence-level embeddings for each sentence of the document 220. For example, within the extraction phase, the document processing service 210 may segment the document 220 into individual sentences delineated by terminal punctuation marks such as periods ('.'), question marks ('?'), exclamation marks ('!'), or any combination thereof. In some cases, the document processing service 210 may use regular expressions to detect such terminal punctuation marks. Additionally, or alternatively, the document processing service 210 may use a program or computer language library (e.g., Natural Language Toolkit (nltk) library) to segment the sentences of the document 220. In some cases, the document processing service 210 may segment sentences by a period and a space and refrain from segmenting sentences by question marks. For example, due to a question and answer most likely being grouped together within the document 220 it may be useful to have the question and answer together when generating the sentence embeddings via the embedding model. Moreover, in cases of non-standardized texts that lack clear sentence demarcation, the extractive procedure may result in disproportionately long sentences. To avoid relatively long sentences, the document processing service 210 may use a tokenization threshold to segment any sentence satisfying the tokenization threshold into a smaller and relatively more manageable sub-sentence as described elsewhere herein.

Further, the computing system 200 may utilize the embedding model to derive the sentence embeddings of the individual sentences extracted by the document processing service 210. In some cases, the embedding model may be a compact, encoder-only model that is capable of operating on CPUs rather than GPUs to reduce the inferences costs of the document 220 summarization. Additionally, or alternatively, the embedding model may be a relatively smaller model to ensure an expedited embedding extraction. For example, if the document 220 has a relatively large quantity of sentences, generating the embedding for each sentence may be relatively time consuming using a large embedding model. Thus, using a smaller embedding model, the document processing service 210 may be capable of reducing the latency of the summarization process.

In some examples, based on obtaining the sentence embeddings, the document processing service 210 may then select a subset of sentences 235 that are representative of the document 220. In some examples, to select the subset of sentences 235 the document processing service 210 may utilize a Euclidean distance of sentences against global embeddings (e.g., embeddings of the document 220 as a whole). Such techniques may be used to reduce the quantity of queries to the LLM 215 to a single query using the subset of sentences selected by the document processing service 210 as the input to the LLM 215. However, while the EA techniques may reduce the consumption of computational resources and time consumption, such techniques may be relatively inaccurate or ineffective in generating the summary 230 of the document 220. For example, the document processing service 210 may refrain from selecting relatively significant sentences of a document due to the sentences not closely aligning with the global embeddings.

In order to further improve the accuracy of the summary 230 of the document 220 while using a single query to the LLM 215, the techniques of the present disclosure describes using the EA procedure and utilizing an FPS procedure to select a subset of sentences 235 in the extractive phase of the EA procedure. The FPS procedure is generally used in computer visioning and is aimed to select the most representative subset from a larger point cloud. Thus, the techniques of the present disclosure may describe a modified FPS procedure for selecting a subset of sentences 235 from a relatively large set of sentences of a document 220 that can collectively offer the broadest and most accurate representation of the document 220. Further description of the modified FPS procedure to select the subset of sentences 235 may described elsewhere herein, such as with reference to FIG. 3. Moreover, to maintain the context of each selected sentence, the document processing service 210 may further reorder the subset of sentences 235 based on an original sentence ordering within the document 220. Following the sentence reordering, the document processing service 210 may transmit the subset of sentences 235 to the LLM 215 to obtain the summary 230 of the document 220 that is a relatively large.

In some examples, the computing system 200 may perform the extractive phase and the FPS procedure in parallel. For example, using one or more CPUs, the computing system 200 may be capable of segmenting the sentences of the document 220, generating the sentence embeddings of the segmented sentences, and performing representative sentence selection through the FPS procedure concurrently via a parallel processing procedure. In some cases, a series of CPUs may execute the different tasks in parallel. In some other cases, the various tasks may operate on different cores of a single CPU. For example, a CPU may be a multicore processor that is capable of executing multiple different instructions on multiple different cores of the CPU in parallel. Additionally, or alternatively, the tasks associated with the sentence segmentation, sentence embedding generation, and the FPS procedure may be executed across the multiple cores of multiple different CPUs (e.g., two dual-core CPUs executing different tasks on each core of each CPU). Such parallel processing operations may reduce the latency associated with summarizing the document 220 enabling users to summarize longer documents via the LLM 215 in relatively short periods of time by executing tasks concurrently rather than subsequently.

Additionally, or alternatively, the computing system 200 may perform the extractive phase using the document processing service 210 and the FPS procedure to obtain the subset of sentences 235 until a token threshold (e.g., 8,000 tokens) for the subset of sentences 235 has been satisfied. For example, while a model of the LLM 215 may be capable of processing inputs up to 16,385 tokens, the efficacy, reliability, and accuracy of outputs from the LLM 215 may decline with relatively longer inputs. Thus, the computing system 200 may implement the FPS procedure to select vectors associated with sentences until a vector quantity threshold is satisfied, the token threshold is satisfied, or a combination thereof.

Moreover, having a relatively lower quantity of tokens (e.g., 8,000 tokens) within the input for a query to the LLM 215 rather than a higher quantity of tokens (e.g., 12,000 or 16,000 tokens) may enhance the performance of the LLM 215. For example, the performance of the LLM 215 may be measured by coherence, factuality, completeness, instruction following, or any combination thereof, and a lower quantity of tokens used for the query to the LLM 215 may result in a higher combined performance metric. Further, having the document processing service 210 perform the FPS procedure to select the subset of sentences 235 for a single query to the LLM 215 may be relatively more efficient, faster, and accurate compared to performing a series of queries to the LLM 215 on segments of the document 220. For example, the summary of summaries may lose significant content and context when the multiple segment summaries of the document 220 are concatenated together which may also result in an incomplete synthesis in summary 230 of the document 220 based on the concatenation of summaries.

Moreover, in conjunction with the subset of sentences 235 being sent to the LLM 215, a user of the computing device 205 may also transmit the prompt 225 to the LLM 215. In some cases, the prompt 225 may include instruction for the LLM 215 to generate the summary 230 on the subset of sentences 235. Further, the quantity of tokens of the prompt 225 may be included within the quantity of tokens of the query to the LLM 215. Therefore, to ensure that the query to the LLM 215 fits within the context window of the LLM 215, the quantity of tokens of the prompt 225 may be limited by a threshold quantity of tokens. Additionally, or alternatively, the computing system 200 may set a threshold quantity of tokens for the query to the LLM 215 rather than a first threshold quantity of tokens for the input to the LLM 215 and a second threshold quantity of tokens for the prompt 225. Thus, by having such thresholds, the computing system 200 may ensure that both the prompt 225 providing the LLM 215 with summarization instructions (e.g., a summarization prompt) and the subset of sentences 235 are below a threshold quantity of tokens so the query to the LLM 215 can be processed within a single query and the LLM 215 can reliably and accurately generate the summary 230 of the document 220.

Thus, the techniques of the present disclosure may describe the computing system 200 utilizing the document processing service 210 to vectorize sentences of the document 220 with respective sentence embeddings and the FPS procedure to select the subset of sentences 235 for the LLM 215 to enhance the reliability and accuracy of the summary 230 of the document 220. For example, the FPS procedure may enhance the reliability and accuracy of the summary 230 by selecting broad and diverse sentences from the document 220 for the subset of sentences 235. Further description of the FPS procedure in accordance with the techniques of the present disclosure may be described elsewhere herein such as with reference to FIG. 3.

Figure 3:
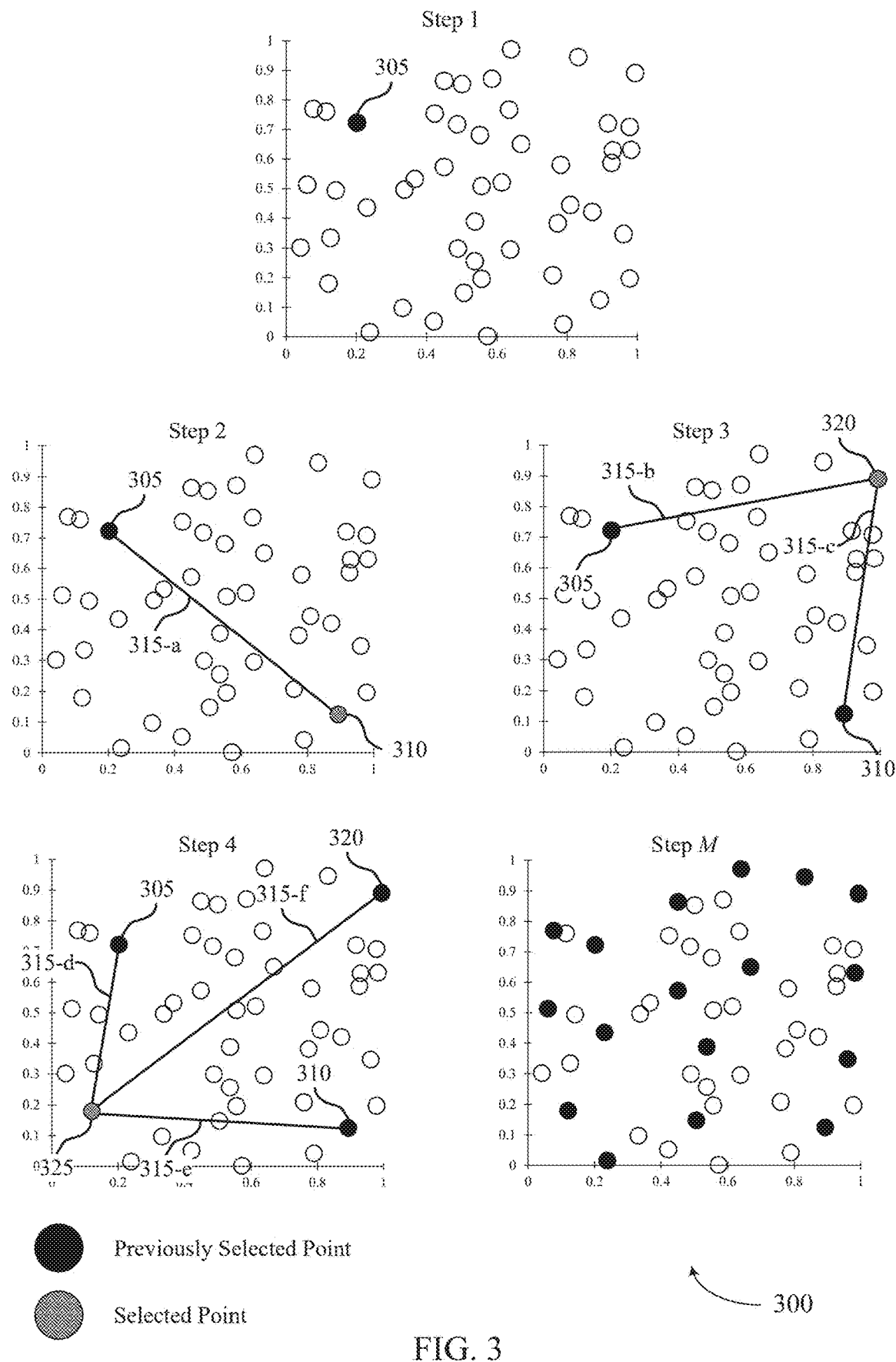
FIG. 3 shows an example of an FPS sentence selection diagram that supports extractive-abstractive large language model summarization with FPS in accordance with aspects of the present disclosure.

FIG. 3 shows an example of an FPS sentence selection diagram 300 that supports extractive-abstractive large language model summarization with FPS in accordance with aspects of the present disclosure. In some examples, the FPS sentence selection diagram 300 implements or may be implemented by the system 100, the computing system 200, or both. For example, the FPS sentence selection diagram 300 may illustrate the FPS procedure utilized by the system 100, the computing system 200, or both select a subset of sentences from a document to summarize the document via an LLM (e.g., the LLM 145 described with reference to FIG. 1 or the LLM 215 described with reference to FIG. 2). Moreover, the FPS sentence selection diagram 300 may illustrate the steps of the FPS procedure that a device or service may utilize to select a subset of sentences of a document for summarizing the document via an LLM when the quantity of tokens of the document exceeds a context window of the LLM.

In some cases, a system or service (e.g., the document processing service 210 described with reference to FIG. 2) may select pivotal sentences of a document for summarization (e.g., abstractive summarization) by extracting a global embedding of the document. In some other cases, a document may be segmented into multiple pieces or segments to derive local embeddings of each segment. Moreover, a cosine similarity may be utilized to identify sentences that exhibit or represent the highest resemblance or similarity to the global embeddings or local embeddings. For example, a subset of sentences of a document may be selected for summarizing a relatively large document by selecting sentences that are similar to the global embedding of the document or similar to the local embedding of a corresponding segment of the document. However, such sentence selection procedure may be relatively inaccurate and unreliable as significant details may be overlooked as many of the summary-relevant sentences selected may be different from the global embedding of the document. Thus, the techniques of the present disclosure may describe an FPS procedure being utilized to prioritize diversity over similarity when selecting sentences for a subset of sentences to summarize a relatively large document. For example, the FPS procedure may enable a selection of a subset of sentences representing a document that ensures maximal distinctiveness among the sentences to enhance the summary generation of an LLM.

In some examples, as described elsewhere herein, the FPS procedure may be used in the field of three-dimensional (3D) computer visioning to select a diverse set of points from a given point cloud while facilitating hierarchical feature extractions for downstream applications. For example, as illustrated herein, the FPS sentence selection diagram 300 may show sentence embeddings (e.g., the data points illustrated herein) in a two dimensional (2D) graph being selected for inclusion in a subset of sentences to represent a document for summarization via an LLM. Moreover, the techniques of the present disclosure may describe a modified version of the FPS procedure used in 3D computer visioning being utilized for document analysis by using the FPS procedure to select the most diverse sentences within a document to enhance the performance on downstream tasks (e.g., document summarization by an LLM).

In some examples, a document that a user has for summarization may have a relatively large quantity of sentences that can be segmented into N sentences after sentence-level division (e.g., extracting sentences from the document based on a delimiter such as a period) and breaking down sentences with a quantity of tokens over a threshold quantity of tokens (e.g., 1,000 tokens). For each segmented sentence, a corresponding sentence embedding may be derived via an embedding model. Thus, within the FPS procedure a first vector, $d \in R^N$, may be initialized with each element representing a distance between sentences being set to a value of positive infinity to represent an initial distance between the elements of the vector. Based on initializing the first vector, a first set of sentences and a second set of sentences may be initialized. The first set of sentences may be an empty set of sentences to represent the selected sentences and the second set of sentences may include all the sentences to represent the set of unselected sentences (e.g., the unselected pool of sentences). As illustrated herein, each data point on the graphs may represent the 2D embedding of respective sentences within a document. Thus, at a first step, an initial target sentence (e.g., a sentence 305) may be chosen at random from the second set of sentences (e.g., the unselected sentences) and transferred to the selected set of sentences. For example, a randomization procedure may be utilized to select the sentence 305 as the initial target sentence. Following, the FPS procedure illustrated herein may follow an iterative process to select the subset of sentences to be used to represent a document for summarization of the document via an LLM.

At step 2 illustrated herein, a second vector, $d' \in R^N$, may be constructed to calculate the vector-space distance 315 (e.g., a Euclidean distance) between each unselected sentence and the selected sentences (e.g., the sentence 305). Such procedure may be executed in O(N) time. Following calculating the Euclidean distance between each point in the first set and each point in the second set, the vector d may be updated by using the minimum of d and d', which can be accomplished in O(N) time. Moreover, the point furthest away from the current selection (e.g., the sentence 305) may be identified by locating the maximum value in d. Thus, the next target sentence (e.g., the sentence 310) may be identified by the maximum index in d and the sentence 310 is subsequently transferred from the second set of unselected sentences to the first set of selected sentences, a process that can be performed in O(N) time. For example, the sentence 305 may be a vector-space distance 315-a away from the sentence 310 which may be the maximum vector-space distance 315 between the sentence 305 and another sentence within the set of sentences of the document.

At step 3 illustrated herein, the procedure described herein may be repeated to select a sentence 320 for the subset of sentences used for the LLM query input. For example, the vector-space distance 315 may be calculated between each point (e.g., sentence) in the first set of selected sentences and each point in the second set of unselected sentences. Then, once the maximum distances are obtained, a minimum of those values may be selected to select the sentence 320 for the subset of sentences that is a vector-space distance 315-b from the sentence 305 and a vector-space distance 315-c from the sentence 310. The minimum value of the set of maximum distances may be used to ensure that the sentences selected for the subset of sentences are diverse and cover the whole document. If the maximum vector-space distance 315 between each point in the first set of sentences and the second set of sentences was used, then all the selected sentences would be converged around the sentence 310 based on being the farthest away from the sentence 305 that was the initial selected sentence.

Therefore, in accordance with the techniques of the present disclosure, the sentence 320 may be removed from the second set of sentences that are unselected and added to the first set of sentences that are selected for the subset of sentences. Moreover, at step 4, the sentence 325 may be selected based on finding a respective unselected sentence that is a maximum vector-space distance 315 between the sentence 305, the sentence 310, and the sentence 320 and each other unselected sentence and using the minimum of the three maximums to select the sentence 325. Thus, the sentence 325 that is a vector-space distance 315-d from the sentence 305, a vector-space distance 315-e from the sentence 310, and a vector-space distance 315-f from the sentence 320 may be removed from the second set of sentences unselected and added to the first set of sentences that are selected for the subset of sentences. Such iterative process described herein may continue to be repeated until a quantity of selected sentences meets a preset threshold quantity, M, to complete the downstream abstractive summarization task of the techniques of the present disclosure (e.g., the LLM document summarization). Thus, with M sentences being selected from a set of N sentences of a document, where M<<N, the overall time complexity of the FPS procedure illustrated in the FPS sentence selection diagram 300 may be O(MN).

In some examples, while the modified FPS procedure described in accordance with the techniques of the present disclosure may select the most diverse sentences from a document, the FPS procedure may fail to capture or select the most significant sentences of the document. Therefore, in accordance with the techniques of the present disclosure, an enhanced modified FPS procedure may be described that integrates the modified FPS procedure with the global embedding of a document resulting in a relatively more balanced, accurate, and reliable sentence selection process. To obtain a global embedding of a document a global embedding extraction phase may be performed to derive the global embedding that is an average embedding of all the sentences within a document. Therefore, the global embedding may be used as a reference for evaluating the importance of respective sentences.

Further, when the vector-space distance 315 is calculated between sentence embeddings, the vector-space distance 315 may be calculated as a weighted summation of the vector-space distance 315 between the embeddings of candidate sentences and the embeddings of previously selected sentences and the vector-space distance 315 between the candidate sentences and the global embedding. For example, a parameter a may be used to adjust the balance between selecting diverse sentences via the FPS procedure and selecting sentences that are closer to the global embedding (e.g., sentences that are relatively more significant and associated with the overall concept and purpose of the document). In some cases, if the parameter a is set to a value of 0, the global embedding may be ignored and the modified FPS procedure may select sentences based on vector-space distances 315. In some other cases, if the parameter a is set to a value above 0 then the global embedding may be considered by the modified FPS procedure described herein when selecting sentences for the subset of sentences to represent a document. Additionally, or alternatively, if the parameter a is set to a value of 1 then each sentence selected may be based on the distance to the global embedding which may result in some inaccurate summary generations. Therefore, the parameter a may be a value between 0 and 1 (e.g., $0 \leq \alpha < 1$). Moreover, by using the parameter a the FPS procedure described herein in accordance with the techniques of the present disclosure may enable a relatively more nuanced sentence selection process to ensure that the selected sentences are both diverse and representative of the overall content of a document.

Therefore, the modified FPS procedure illustrated by the FPS sentence selection diagram 300 may ensure that an accurate representation of a document can be represented by a subset of sentences of the document. By selecting the subset of sentences, users may be capable of using LLMs to summarize relatively long documents (e.g., documents with hundreds of pages, hundreds of thousands of tokens, or both) efficiently, accurately, and reliably while minimizing the latency associated with multiple LLM queries. Further descriptions of the techniques of the present disclosure enabling the summarization of relatively large documents via an LLM may be described elsewhere herein, such as with reference to FIG. 4.

Figure 4:
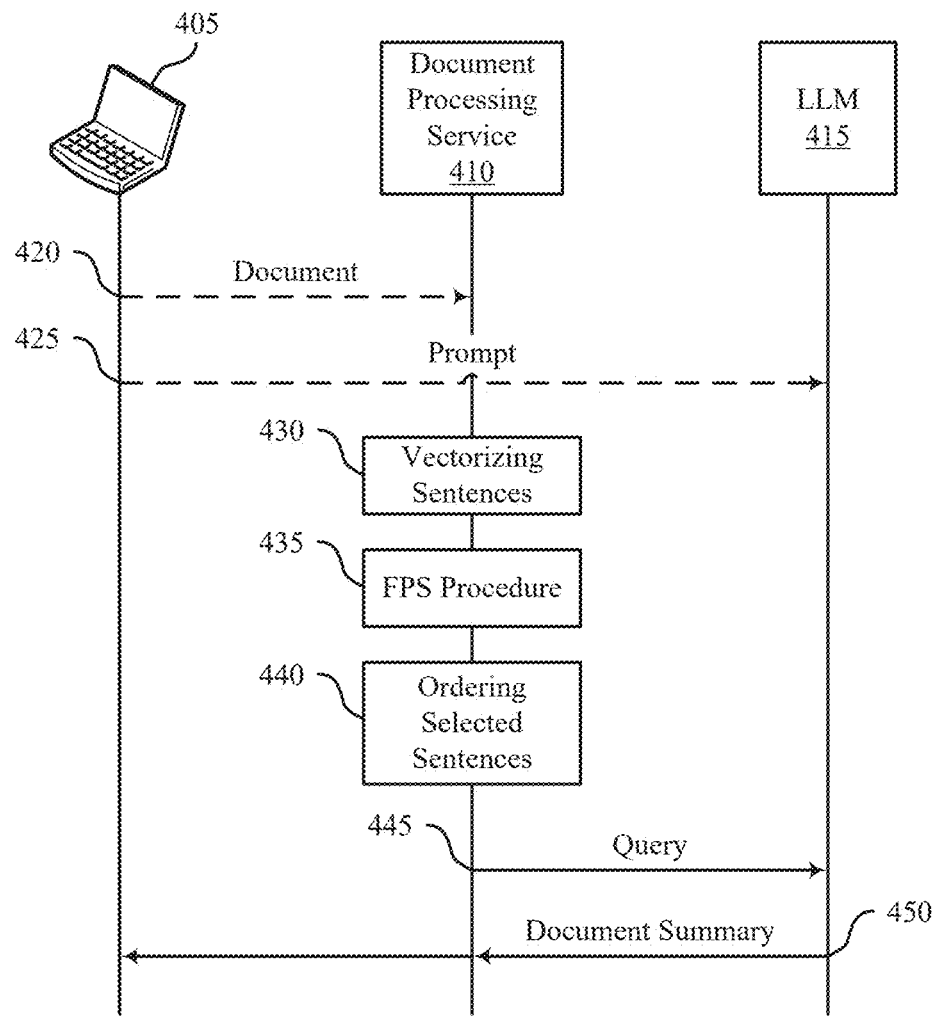
FIG. 4 shows an example of a process flow that supports extractive-abstractive large language model summarization with FPS in accordance with aspects of the present disclosure.

FIG. 4 shows an example of a process flow 400 that supports extractive-abstractive large language model summarization with FPS in accordance with aspects of the present disclosure. In some examples, the process flow 400 may implement or may be implemented by the system 100, the computing system 200, the FPS sentence selection diagram 300, or any combination thereof. The process flow may include a computing device 405, a document processing service 410, and an LLM 415, which may be examples of devices or services described elsewhere herein including with reference to FIGS. 1 and 2.

In the following description of the process flow 400, the operations may be performed by the computing device 405, the document processing service 410, and the LLM 415 in different orders or at different times. Some operations may also be left out of the process flow 400, or other operations may be added. Although the process flow 400 may be described as being performed by the computing device 405, the document processing service 410, and the LLM 415, some aspects of some operations may also be performed by other devices, services, or models described elsewhere herein including with reference to FIGS. 1 and 2.

At 420, the computing device 405 may transmit, to the document processing service 410, a document for processing prior to being summarized by the LLM 415. At 425, the computing device 405 may transmit, to the LLM 415, a prompt (e.g., a summarization prompt) that provides instructions for summarizing a document. In some cases, the document processing service 410 may be a part of or a component of the LLM 415 such that the computing device 405 may transmit the document and the prompt together to the LLM 415. For example, based on the document having a length that satisfies a document length threshold or the document having a quantity of tokens above the token limit of the context window of the LLM 415, the LLM 415 may use the document processing service 410 to reduce the length or reduce the quantity of tokens of the input document using the following steps or operations.

At 430, the document processing service 410 may utilize an embedding model to vectorize a set of sentences of a document into a set of vectors. In some examples, the vectorizing of the set of sentences into the set of vectors may include extracting, via the embedding model, one or more embeddings for the set of sentences, where the set of vectors represents the one or more embeddings of the set of sentences. In some other examples, a respective sentence from the set of sentences of the document may be segmented into two or more vectors of the set of vectors based on a quantity of tokens associated with the respective sentence satisfying a vector token threshold.

At 435, the document processing service 410 may select, via FPS procedure, a subset of vectors of the set of vectors based on a vector-space distance between respective vectors of the subset of vectors. In some cases, the document processing service 410 may select the subset of vectors such that a quantity of vectors within the subset of vectors satisfies a vector quantity threshold. In some examples, the selection of the subset of vectors via the FPS procedure may include the document processing service 410 selecting a first vector for the subset of vectors via a randomization procedure. In some other examples, the document processing service 410 may select the first vector for the subset of vectors based on the first vector being associated with a global embedding value that corresponds to the document. For example, the document processing service 410 may select the subset of vectors based on both the vector-space distance between the respective vectors of the subset of vectors and the global embedding value. Moreover, the subset of vectors of the set of vectors may be associated with one or more sentences of the set of sentences that represent the document as a whole for transmitting the query to the large language model. In some cases, the document processing service 410 may execute the embedding model to vectorize the set of sentences into the set of vectors and the FPS procedure to select the subset of vectors via a parallel processing procedure. For example, one or more processors (e.g., CPUs) may be executed concurrently via a parallel processing procedure to perform an extraction of sentence embeddings via the embedding model and to perform the FPS procedure.

At 440, based on the document processing service 410 selecting the subset of vectors via the FPS procedure, the document processing service 410 may order the subset of vectors according to a corresponding sentence order within the document. At 445, the document processing service 410 may transmit, to the LLM 415, a query including a summarization prompt and an input including a subset of sentences of the set of sentences that are associated with the subset of vectors. In some examples, a quantity of tokens associated with the summarization prompt may be based on a prompt token threshold. Additionally, or alternatively, if the document processing service 410 is a component of, connected to, a service of the LLM 415, or any combination thereof, the computing device 405 may transmit the query to the LLM 415. At 450, the computing device 405 may receive, from the LLM 415, a summary of the document based on transmitting the query.

Figure 5:
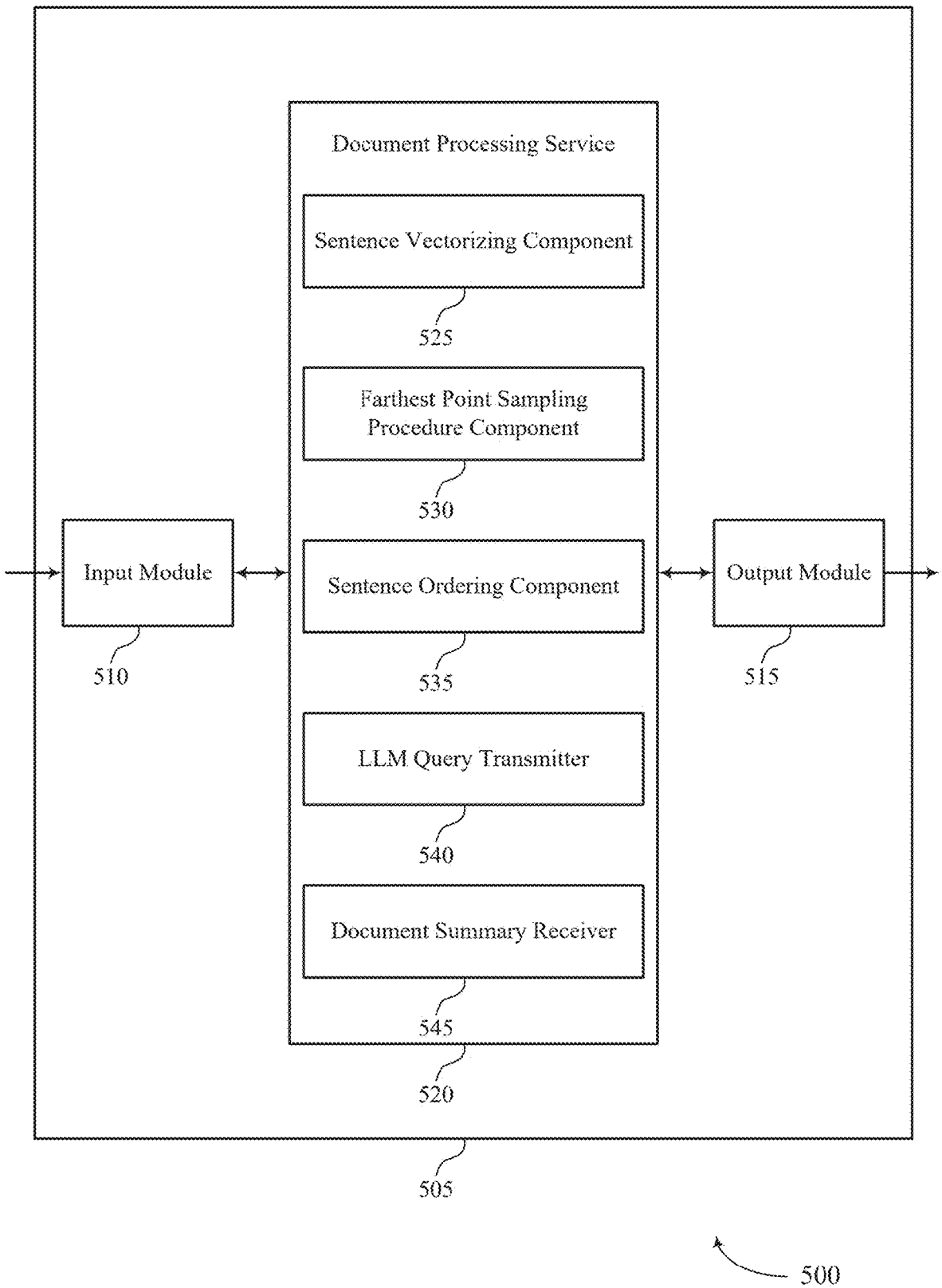
FIG. 5 shows a block diagram of an apparatus that supports extractive-abstractive large language model summarization with FPS in accordance with aspects of the present disclosure.

FIG. 5 shows a block diagram 500 of a device 505 that supports extractive-abstractive large language model summarization with FPS in accordance with aspects of the present disclosure. The device 505 may include an input module 510, an output module 515, and a document processing service 520. The device 505, or one or more components of the device 505 (e.g., the input module 510, the output module 515, the document processing service 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the document processing service 520 to support extractive-abstractive large language model summarization with FPS. In some cases, the input module 510 may be a component of an input/output (I/O) controller 710 as described with reference to FIG. 7.

The output module 515 may manage output signals for the device 505. For example, the output module 515 may receive signals from other components of the device 505, such as the document processing service 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the document processing service 520 may include a sentence vectorizing component 525, a FPS procedure component 530, a sentence ordering component 535, an LLM query transmitter 540, a document summary receiver 545, or any combination thereof. In some examples, the document processing service 520, or various components thereof, may be configured to perform various operations (e.g., receiving, monitoring, transmitting) using or otherwise in cooperation with the input module 510, the output module 515, or both. For example, the document processing service 520 may receive information from the input module 510, send information to the output module 515, or be integrated in combination with the input module 510, the output module 515, or both to receive information, transmit information, or perform various other operations as described herein.

The document processing service 520 may support data processing in accordance with examples as disclosed herein. The sentence vectorizing component 525 may be configured to support vectorizing, via an embedding model, a set of sentences of a document into a set of vectors. The FPS procedure component 530 may be configured to support selecting, via a FPS procedure, a subset of vectors of the set of vectors based on a vector-space distance between respective vectors of the subset of vectors. The sentence ordering component 535 may be configured to support ordering the subset of vectors according to a corresponding sentence order within the document. The LLM query transmitter 540 may be configured to support transmitting, to a large language model, a query including a summarization prompt and an input including a subset of sentences of the set of sentences that are associated with the subset of vectors. The document summary receiver 545 may be configured to support receiving, from the large language model, a summary of the document based on transmitting the query.

Figure 6:
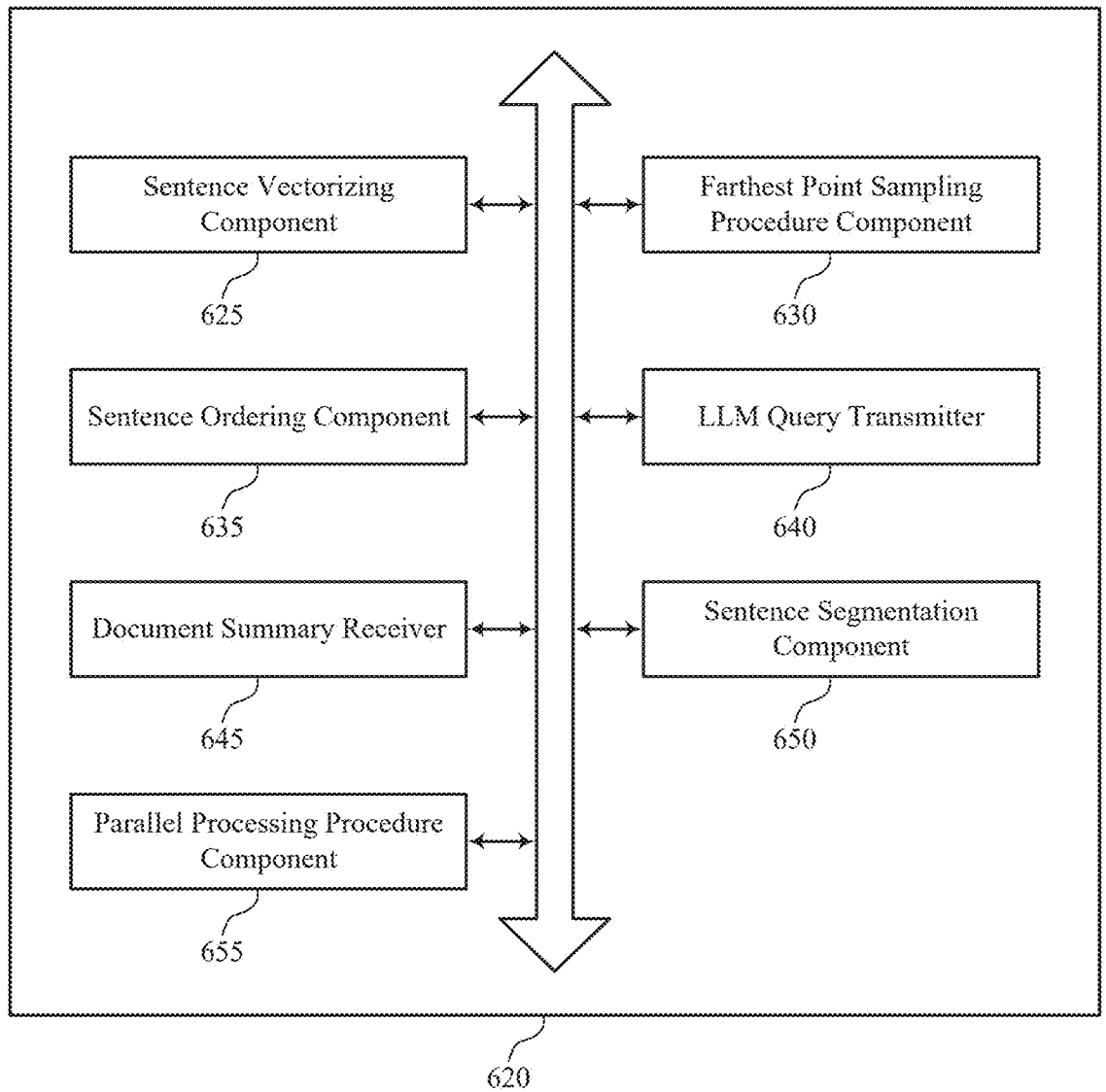
FIG. 6 shows a block diagram of a document processing service that supports extractive-abstractive large language model summarization with FPS in accordance with aspects of the present disclosure.

FIG. 6 shows a block diagram 600 of a document processing service 620 that supports extractive-abstractive large language model summarization with FPS in accordance with aspects of the present disclosure. The document processing service 620 may be an example of aspects of a document processing service or a document processing service 520, or both, as described herein. The document processing service 620, or various components thereof, may be an example of means for performing various aspects of extractive-abstractive large language model summarization with FPS as described herein. For example, the document processing service 620 may include a sentence vectorizing component 625, a FPS procedure component 630, a sentence ordering component 635, an LLM query transmitter 640, a document summary receiver 645, a sentence segmentation component 650, a parallel processing procedure component 655, or any combination thereof. Each of these components, or components of subcomponents thereof (e.g., one or more processors, one or more memories), may communicate, directly or indirectly, with one another (e.g., via one or more buses).

The document processing service 620 may support data processing in accordance with examples as disclosed herein. The sentence vectorizing component 625 may be configured to support vectorizing, via an embedding model, a set of sentences of a document into a set of vectors. The FPS procedure component 630 may be configured to support selecting, via a FPS procedure, a subset of vectors of the set of vectors based on a vector-space distance between respective vectors of the subset of vectors. The sentence ordering component 635 may be configured to support ordering the subset of vectors according to a corresponding sentence order within the document. The LLM query transmitter 640 may be configured to support transmitting, to a large language model, a query including a summarization prompt and an input including a subset of sentences of the set of sentences that are associated with the subset of vectors. The document summary receiver 645 may be configured to support receiving, from the large language model, a summary of the document based on transmitting the query.

In some examples, the sentence segmentation component 650 may be configured to support segmenting a respective sentence from the set of sentences of the document into two or more vectors of the set of vectors based on a quantity of tokens associated with the respective sentence satisfying a vector token threshold.

In some examples, the parallel processing procedure component 655 may be configured to support executing, via one or more central processing units, the embedding model to vectorize the set of sentences into the set of vectors and the FPS procedure to select the subset of vectors via a parallel processing procedure.

In some examples, to support selecting the subset of vectors via the FPS procedure, the FPS procedure component 630 may be configured to support selecting a first vector for the subset of vectors via a randomization procedure.

In some examples, to support selecting the subset of vectors via the FPS procedure, the FPS procedure component 630 may be configured to support selecting a first vector for the subset of vectors based on the first vector being associated with a global embedding value that corresponds to the document.

In some examples, the subset of vectors are selected based on both the vector-space distance between the respective vectors of the subset of vectors and the global embedding value.

In some examples, to support selecting the subset of vectors, the FPS procedure component 630 may be configured to support selecting, via the FPS procedure, the subset of vectors of the set of vectors such that a quantity of vectors within the subset of vectors satisfies a vector quantity threshold.

In some examples, to support vectorizing the set of sentences into the set of vectors, the sentence vectorizing component 625 may be configured to support extracting, via the embedding model, one or more embeddings for the set of sentences, where the set of vectors represents the one or more embeddings of the set of sentences.

In some examples, the subset of vectors of the set of vectors are associated with one or more sentences of the set of sentences that represent the document as a whole for transmitting the query to the large language model.

In some examples, a quantity of tokens associated with the summarization prompt is based on a prompt token threshold.

Figure 7:
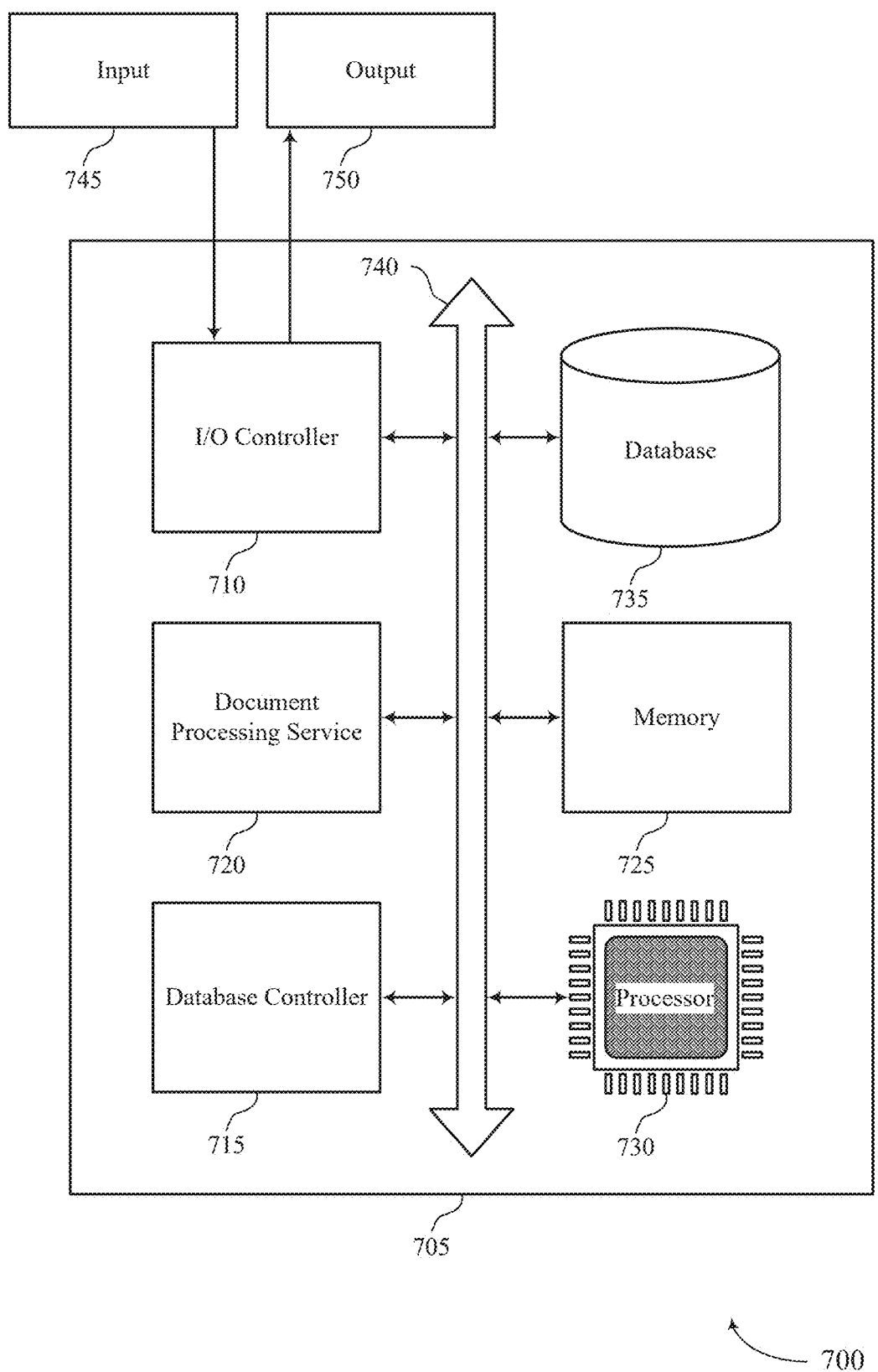
FIG. 7 shows a diagram of a system including a device that supports extractive-abstractive large language model summarization with FPS in accordance with aspects of the present disclosure.

FIG. 7 shows a diagram of a system 700 including a device 705 that supports extractive-abstractive large language model summarization with FPS in accordance with aspects of the present disclosure. The device 705 may be an example of or include components of a device 505 as described herein. The device 705 may include components for bi-directional data communications including components for transmitting and receiving communications, such as a document processing service 720, an I/O controller, such as an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a CPU, a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting extractive-abstractive large language model summarization with FPS). The processor 730 may be an example of a single processor or multiple processors. For example, the device 705 may include one or more processors 730.

The document processing service 720 may support data processing in accordance with examples as disclosed herein. For example, the document processing service 720 may be configured to support vectorizing, via an embedding model, a set of sentences of a document into a set of vectors. The document processing service 720 may be configured to support selecting, via a FPS procedure, a subset of vectors of the set of vectors based on a vector-space distance between respective vectors of the subset of vectors. The document processing service 720 may be configured to support ordering the subset of vectors according to a corresponding sentence order within the document. The document processing service 720 may be configured to support transmitting, to a large language model, a query including a summarization prompt and an input including a subset of sentences of the set of sentences that are associated with the subset of vectors. The document processing service 720 may be configured to support receiving, from the large language model, a summary of the document based on transmitting the query.

By including or configuring the document processing service 720 in accordance with examples as described herein, the device 705 may support techniques for summarizing relatively large documents to support improved communication reliability, reduced latency, improved user experience related to reduced processing, reduced power consumption, more efficient utilization of communication resources, and improved utilization of processing capability.

Figure 8:
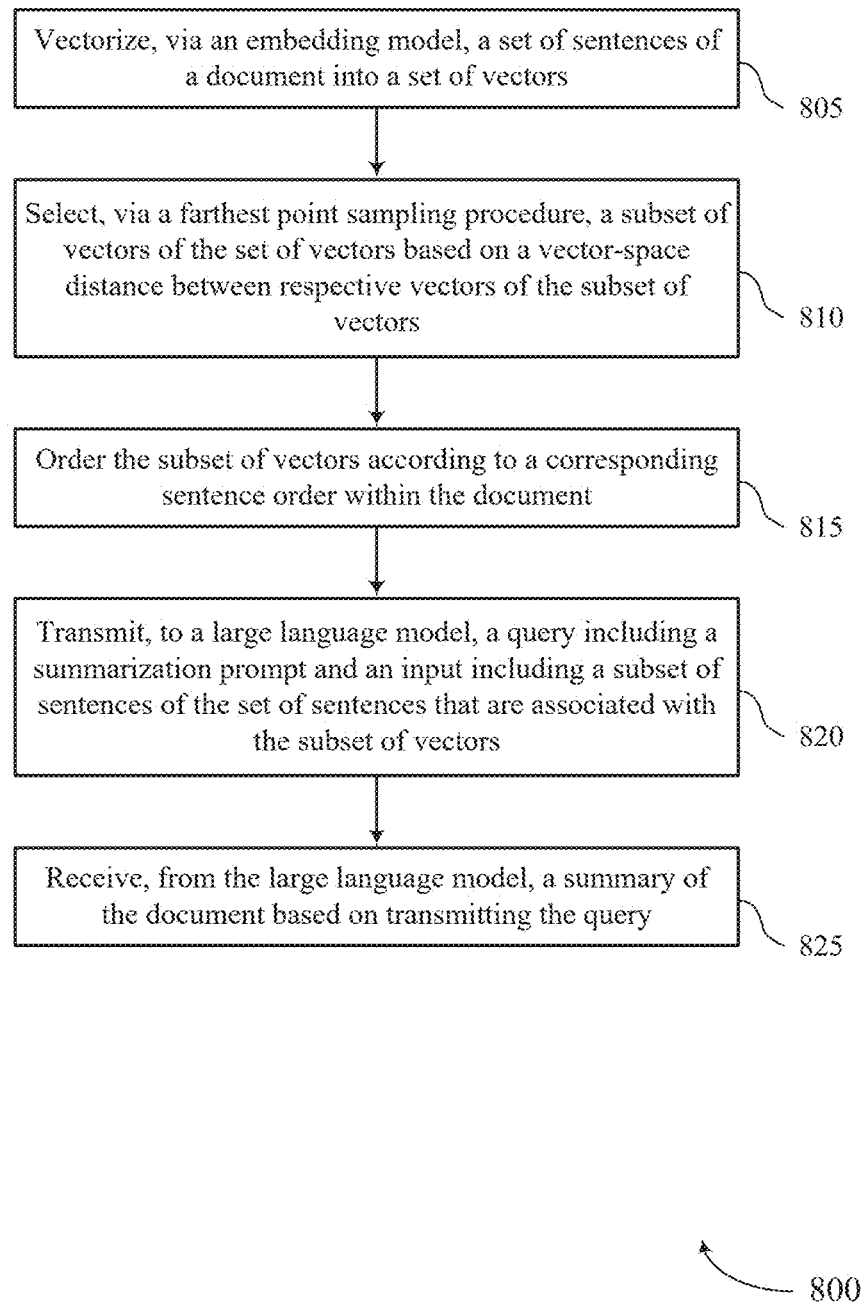
FIG. 8 shows a flowchart illustrating methods that support extractive-abstractive large language model summarization with FPS in accordance with aspects of the present disclosure.

FIG. 8 shows a flowchart illustrating a method 800 that supports extractive-abstractive large language model summarization with FPS in accordance with aspects of the present disclosure. The operations of the method 800 may be implemented by a computing device or its components as described herein. For example, the operations of the method 800 may be performed by a computing device as described with reference to FIGS. 1 through 7. In some examples, a computing device may execute a set of instructions to control the functional elements of the computing device to perform the described functions. Additionally, or alternatively, the computing device may perform aspects of the described functions using special-purpose hardware.

At 805, the method may include vectorizing, via an embedding model, a set of sentences of a document into a set of vectors. The operations of 805 may be performed in accordance with examples as disclosed herein. In some examples, aspects of the operations of 805 may be performed by a sentence vectorizing component 625 as described with reference to FIG. 6.

At 810, the method may include selecting, via a FPS procedure, a subset of vectors of the set of vectors based on a vector-space distance between respective vectors of the subset of vectors. The operations of 810 may be performed in accordance with examples as disclosed herein. In some examples, aspects of the operations of 810 may be performed by a FPS procedure component 630 as described with reference to FIG. 6.

At 815, the method may include ordering the subset of vectors according to a corresponding sentence order within the document. The operations of 815 may be performed in accordance with examples as disclosed herein. In some examples, aspects of the operations of 815 may be performed by a sentence ordering component 635 as described with reference to FIG. 6.

At 820, the method may include transmitting, to a large language model, a query including a summarization prompt and an input including a subset of sentences of the set of sentences that are associated with the subset of vectors. The operations of 820 may be performed in accordance with examples as disclosed herein. In some examples, aspects of the operations of 820 may be performed by an LLM query transmitter 640 as described with reference to FIG. 6.

At 825, the method may include receiving, from the large language model, a summary of the document based on transmitting the query. The operations of 825 may be performed in accordance with examples as disclosed herein. In some examples, aspects of the operations of 825 may be performed by a document summary receiver 645 as described with reference to FIG. 6.

A method for data processing by an apparatus is described. The method may include vectorizing, via an embedding model, a set of sentences of a document into a set of vectors, selecting, via a FPS procedure, a subset of vectors of the set of vectors based on a vector-space distance between respective vectors of the subset of vectors, ordering the subset of vectors according to a corresponding sentence order within the document, transmitting, to a large language model, a query including a summarization prompt and an input including a subset of sentences of the set of sentences that are associated with the subset of vectors, and receiving, from the large language model, a summary of the document based on transmitting the query.

An apparatus for data processing is described. The apparatus may include one or more memories storing processor executable code, and one or more processors coupled with the one or more memories. The one or more processors may individually or collectively be operable to execute the code to cause the apparatus to vectorizing, via an embedding model, a set of sentences of a document into a set of vectors, select, via a FPS procedure, a subset of vectors of the set of vectors based on a vector-space distance between respective vectors of the subset of vectors, order the subset of vectors according to a corresponding sentence order within the document, transmit, to a large language model, a query including a summarization prompt and an input including a subset of sentences of the set of sentences that are associated with the subset of vectors, and receive, from the large language model, a summary of the document based on transmitting the query.

Another apparatus for data processing is described. The apparatus may include means for vectorizing, via an embedding model, a set of sentences of a document into a set of vectors, means for selecting, via a FPS procedure, a subset of vectors of the set of vectors based on a vector-space distance between respective vectors of the subset of vectors, means for ordering the subset of vectors according to a corresponding sentence order within the document, means for transmitting, to a large language model, a query including a summarization prompt and an input including a subset of sentences of the set of sentences that are associated with the subset of vectors, and means for receiving, from the large language model, a summary of the document based on transmitting the query.

A non-transitory computer-readable medium storing code for data processing is described. The code may include instructions executable by one or more processors to vectorizing, via an embedding model, a set of sentences of a document into a set of vectors, select, via a FPS procedure, a subset of vectors of the set of vectors based on a vector-space distance between respective vectors of the subset of vectors, order the subset of vectors according to a corresponding sentence order within the document, transmit, to a large language model, a query including a summarization prompt and an input including a subset of sentences of the set of sentences that are associated with the subset of vectors, and receive, from the large language model, a summary of the document based on transmitting the query.

Some examples of the method, apparatus, and non-transitory computer-readable medium described herein may further include operations, features, means, or instructions for segmenting a respective sentence from the set of sentences of the document into two or more vectors of the set of vectors based on a quantity of tokens associated with the respective sentence satisfying a vector token threshold.

Some examples of the method, apparatus, and non-transitory computer-readable medium described herein may further include operations, features, means, or instructions for executing, via one or more central processing units, the embedding model to vectorize the set of sentences into the set of vectors and the FPS procedure to select the subset of vectors via a parallel processing procedure.

In some examples of the method, apparatus, and non-transitory computer-readable medium described herein, selecting the subset of vectors via the FPS procedure may include operations, features, means, or instructions for selecting a first vector for the subset of vectors via a randomization procedure.

In some examples of the method, apparatus, and non-transitory computer-readable medium described herein, selecting the subset of vectors via the FPS procedure may include operations, features, means, or instructions for selecting a first vector for the subset of vectors based on the first vector being associated with a global embedding value that corresponds to the document.

In some examples of the method, apparatus, and non-transitory computer-readable medium described herein, the subset of vectors may be selected based on both the vector-space distance between the respective vectors of the subset of vectors and the global embedding value.

In some examples of the method, apparatus, and non-transitory computer-readable medium described herein, selecting the subset of vectors may include operations, features, means, or instructions for selecting, via the FPS procedure, the subset of vectors of the set of vectors such that a quantity of vectors within the subset of vectors satisfies a vector quantity threshold.

In some examples of the method, apparatus, and non-transitory computer-readable medium described herein, vectorizing the set of sentences into the set of vectors may include operations, features, means, or instructions for extracting, via the embedding model, one or more embeddings for the set of sentences, where the set of vectors represents the one or more embeddings of the set of sentences.

In some examples of the method, apparatus, and non-transitory computer-readable medium described herein, the subset of vectors of the set of vectors may be associated with one or more sentences of the set of sentences that represent the document as a whole for transmitting the query to the large language model.

In some examples of the method, apparatus, and non-transitory computer-readable medium described herein, a quantity of tokens associated with the summarization prompt may be based on a prompt token threshold.

The following provides an overview of aspects of the present disclosure:

Aspect 1: A method for data processing, comprising: vectorizing, via an embedding model, a set of sentences of a document into a set of vectors; selecting, via a FPS procedure, a subset of vectors of the set of vectors based at least in part on a vector-space distance between respective vectors of the subset of vectors; ordering the subset of vectors according to a corresponding sentence order within the document; transmitting, to a large language model, a query comprising a summarization prompt and an input comprising a subset of sentences of the set of sentences that are associated with the subset of vectors; and receiving, from the large language model, a summary of the document based at least in part on transmitting the query.

Aspect 2: The method of aspect 1, further comprising: segmenting a respective sentence from the set of sentences of the document into two or more vectors of the set of vectors based at least in part on a quantity of tokens associated with the respective sentence satisfying a vector token threshold.

Aspect 3: The method of any of aspects 1 through 2, further comprising: executing, via one or more central processing units, the embedding model to vectorize the set of sentences into the set of vectors and the FPS procedure to select the subset of vectors via a parallel processing procedure.

Aspect 4: The method of any of aspects 1 through 3, wherein selecting the subset of vectors via the FPS procedure comprises: selecting a first vector for the subset of vectors via a randomization procedure.

Aspect 5: The method of any of aspects 1 through 4, wherein selecting the subset of vectors via the FPS procedure comprises: selecting a first vector for the subset of vectors based at least in part on the first vector being associated with a global embedding value that corresponds to the document.

Aspect 6: The method of aspect 5, wherein the subset of vectors are selected based at least in part on both the vector-space distance between the respective vectors of the subset of vectors and the global embedding value.

Aspect 7: The method of any of aspects 1 through 6, wherein selecting the subset of vectors comprises: selecting, via the FPS procedure, the subset of vectors of the set of vectors such that a quantity of vectors within the subset of vectors satisfies a vector quantity threshold.

Aspect 8: The method of any of aspects 1 through 7, wherein vectorizing the set of sentences into the set of vectors comprises: extracting, via the embedding model, one or more embeddings for the set of sentences, wherein the set of vectors represents the one or more embeddings of the set of sentences.

Aspect 9: The method of any of aspects 1 through 8, wherein the subset of vectors of the set of vectors are associated with one or more sentences of the set of sentences that represent the document as a whole for transmitting the query to the large language model.

Aspect 10: The method of any of aspects 1 through 9, wherein a quantity of tokens associated with the summarization prompt is based at least in part on a prompt token threshold.

Aspect 11: An apparatus for data processing, comprising one or more memories storing processor-executable code, and one or more processors coupled with the one or more memories and individually or collectively operable to execute the code to cause the apparatus to perform a method of any of aspects 1 through 10.

Aspect 12: An apparatus for data processing, comprising at least one means for performing a method of any of aspects 1 through 10.

Aspect 13: A non-transitory computer-readable medium storing code for data processing, the code comprising instructions executable by one or more processors to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   vectorizing, via an embedding model, a set of sentences of a document into a set of vectors;
   selecting, via a farthest point sampling procedure, a subset of vectors of the set of vectors based at least in part on a vector-space distance between respective vectors of the subset of vectors and on a parameter indicative of a level of attention to a global embedding value that corresponds to the document, wherein the farthest point sampling procedure is executed to select the subset of vectors from the set of vectors concurrently with an execution of the embedding model to vectorize the set of sentences into the set of vectors;
   ordering the subset of vectors according to a corresponding sentence order within the document;
   transmitting, to a large language model, a query comprising a summarization prompt and an input comprising a subset of sentences of the set of sentences that are associated with the subset of vectors; and
   receiving, from the large language model, a summary of the document based at least in part on transmitting the query.

2. The method of claim 1, further comprising:
   segmenting a respective sentence from the set of sentences of the document into two or more vectors of the set of vectors based at least in part on a quantity of tokens associated with the respective sentence satisfying a vector token threshold.

3. The method of claim 1, further comprising:
   executing, via one or more central processing units, the embedding model to vectorize the set of sentences into the set of vectors and the farthest point sampling procedure to select the subset of vectors via a parallel processing procedure, wherein the farthest point sampling procedure is executed to select the subset of vectors concurrently with an execution of the embedding model to vectorize the set of sentences in accordance with the parallel processing procedure.

4. The method of claim 1, wherein selecting the subset of vectors via the farthest point sampling procedure comprises:
   selecting a first vector for the subset of vectors via a randomization procedure.

5. The method of claim 1, wherein selecting the subset of vectors via the farthest point sampling procedure comprises:
   selecting a first vector for the subset of vectors based at least in part on the first vector being associated with the global embedding value that corresponds to the document.

6. The method of claim 5, wherein the subset of vectors are selected based at least in part on both the vector-space distance between the respective vectors of the subset of vectors and the global embedding value.

7. The method of claim 1, wherein selecting the subset of vectors comprises:
selecting, via the farthest point sampling procedure, the subset of vectors of the set of vectors such that a quantity of vectors within the subset of vectors satisfies a vector quantity threshold.

8. The method of claim 1, wherein vectorizing the set of sentences into the set of vectors comprises:
extracting, via the embedding model, one or more embeddings for the set of sentences, wherein the set of vectors represents the one or more embeddings of the set of sentences.

9. The method of claim 1, wherein the subset of vectors of the set of vectors are associated with one or more sentences of the set of sentences that represent the document as a whole for transmitting the query to the large language model.

10. The method of claim 1, wherein a quantity of tokens associated with the summarization prompt is based at least in part on a prompt token threshold.

11. An apparatus for data processing, comprising:
one or more memories storing processor-executable code; and
one or more processors coupled with the one or more memories and individually or collectively operable to execute the code to cause the apparatus to:
vectorize, via an embedding model, a set of sentences of a document into a set of vectors;
select, via a farthest point sampling procedure, a subset of vectors of the set of vectors based at least in part on a vector-space distance between respective vectors of the subset of vectors and on a parameter indicative of a level of attention to a global embedding value that corresponds to the document, wherein the farthest point sampling procedure is executed to select the subset of vectors from the set of vectors concurrently with an execution of the embedding model to vectorize the set of sentences into the set of vectors;
order the subset of vectors according to a corresponding sentence order within the document;
transmit, to a large language model, a query comprising a summarization prompt and an input comprising a subset of sentences of the set of sentences that are associated with the subset of vectors; and
receive, from the large language model, a summary of the document based at least in part on transmitting the query.

12. The apparatus of claim 11, wherein the one or more processors are individually or collectively further operable to execute the code to cause the apparatus to:
segment a respective sentence from the set of sentences of the document into two or more vectors of the set of vectors based at least in part on a quantity of tokens associated with the respective sentence satisfying a vector token threshold.

13. The apparatus of claim 11, wherein, to select the subset of vectors via the farthest point sampling procedure, the one or more processors are individually or collectively operable to execute the code to cause the apparatus to:
select a first vector for the subset of vectors based at least in part on the first vector being associated with the global embedding value that corresponds to the document.

14. The apparatus of claim 11, wherein, to select the subset of vectors, the one or more processors are individually or collectively operable to execute the code to cause the apparatus to:
select, via the farthest point sampling procedure, the subset of vectors of the set of vectors such that a quantity of vectors within the subset of vectors satisfies a vector quantity threshold.

15. The apparatus of claim 11, wherein, to vectorize the set of sentences into the set of vectors, the one or more processors are individually or collectively operable to execute the code to cause the apparatus to:
extract, via the embedding model, one or more embeddings for the set of sentences, wherein the set of vectors represents the one or more embeddings of the set of sentences.

16. A non-transitory computer-readable medium storing code for data processing, the code comprising instructions executable by one or more processors to:
vectorize, via an embedding model, a set of sentences of a document into a set of vectors;
select, via a farthest point sampling procedure, a subset of vectors of the set of vectors based at least in part on a vector-space distance between respective vectors of the subset of vectors and on a parameter indicative of a level of attention to a global embedding value that corresponds to the document, wherein the farthest point sampling procedure is executed to select the subset of vectors from the set of vectors concurrently with an execution of the embedding model to vectorize the set of sentences into the set of vectors;
order the subset of vectors according to a corresponding sentence order within the document;
transmit, to a large language model, a query comprising a summarization prompt and an input comprising a subset of sentences of the set of sentences that are associated with the subset of vectors; and
receive, from the large language model, a summary of the document based at least in part on transmitting the query.

17. The non-transitory computer-readable medium of claim 16, wherein the instructions are further executable by the one or more processors to:
segment a respective sentence from the set of sentences of the document into two or more vectors of the set of vectors based at least in part on a quantity of tokens associated with the respective sentence satisfying a vector token threshold.

18. The non-transitory computer-readable medium of claim 16, wherein the instructions to select the subset of vectors via the farthest point sampling procedure are executable by the one or more processors to:
select a first vector for the subset of vectors based at least in part on the first vector being associated with the global embedding value that corresponds to the document.

19. The non-transitory computer-readable medium of claim 16, wherein the instructions to select the subset of vectors are executable by the one or more processors to:
select, via the farthest point sampling procedure, the subset of vectors of the set of vectors such that a quantity of vectors within the subset of vectors satisfies a vector quantity threshold.

20. The non-transitory computer-readable medium of claim 16, wherein the instructions to vectorize the set of sentences into the set of vectors are executable by the one or more processors to:

extract, via the embedding model, one or more embeddings for the set of sentences, wherein the set of vectors represents the one or more embeddings of the set of sentences.

* * * * *